(12) United States Patent
Seese et al.

(10) Patent No.: US 6,538,870 B2
(45) Date of Patent: Mar. 25, 2003

(54) CIRCUIT BREAKER AND ELECTRICAL DISTRIBUTION PANEL EMPLOYING THE SAME

(75) Inventors: Daniel Ray Seese, Pittsburgh, PA (US); Wayne Gerald Adamson, Coraopolis, PA (US); James Leo Lagree, McKees Rocks, PA (US); Joseph Jacob Matsko, Beaver, PA (US)

(73) Assignee: Eaton Corporation, Cleveland, OH (US)

(*) Notice: Subject to any disclaimer, the term of this patent is extended or adjusted under 35 U.S.C. 154(b) by 21 days.

(21) Appl. No.: 09/776,235

(22) Filed: Feb. 2, 2001

(65) Prior Publication Data

US 2002/0105770 A1 Aug. 8, 2002

(51) Int. Cl.[7] .......................... H01H 73/00; H02H 7/00; H02H 3/00
(52) U.S. Cl. .......................... 361/115; 361/62
(58) Field of Search .................. 361/116, 115, 361/62, 64, 66; 200/50.26, 308

(56) References Cited

U.S. PATENT DOCUMENTS

| | | | | |
|---|---|---|---|---|
| 4,164,719 A | * | 8/1979 | Young et al. | 335/14 |
| 4,236,149 A | * | 11/1980 | Soyck | 340/644 |
| 4,762,663 A | * | 8/1988 | Cook et al. | 376/259 |
| 4,890,183 A | * | 12/1989 | Champiau | 361/86 |
| 4,918,566 A | | 4/1990 | Brodsky et al. | |
| 5,301,083 A | | 4/1994 | Grass et al. | |
| 5,373,411 A | | 12/1994 | Grass et al. | |
| 5,633,776 A | * | 5/1997 | Juncu et al. | 361/115 |
| 5,705,862 A | | 1/1998 | Lutz et al. | |
| 5,754,113 A | | 5/1998 | Boyer | |
| 6,291,783 B1 | * | 9/2001 | Nebon et al. | 200/50.2 |
| 6,388,858 B1 | * | 5/2002 | Simms et al. | 361/115 |

* cited by examiner

Primary Examiner—Brian Sircus
Assistant Examiner—Z Kitov
(74) Attorney, Agent, or Firm—Martin J. Moran

(57) ABSTRACT

A circuit breaker includes a set of main separable contacts, an operating mechanism for operating the main separable contacts, a set of secondary separable contacts in series with the main separable contacts, and a solenoid mechanism for operating the secondary separable contacts. A first auxiliary switch is responsive to the operating mechanism, and a second auxiliary switch, electrically connected to the first auxiliary switch, is responsive to the solenoid mechanism. An input terminal for a control voltage is electrically connected to the first and second auxiliary switches. A first diode is electrically connected with a forward polarity between the first auxiliary switch and an output terminal. A second diode is electrically connected with a reverse polarity between the second auxiliary switch and the output terminal.

24 Claims, 12 Drawing Sheets

_US 6,538,870 B2_

CIRCUIT BREAKER AND ELECTRICAL DISTRIBUTION PANEL EMPLOYING THE SAME

CROSS-REFERENCE TO RELATED APPLICATIONS

This application is related to commonly owned, U.S. Pat. No. 6,388,858, filed Feb. 28, 2000, entitled "Remotely Controllable Circuit Breaker"; and commonly owned, concurrently filed U.S. patent application Ser. No. 09/776,602, filed Feb. 02, 2001, entitled "Circuit Breaker".

BACKGROUND OF THE INVENTION

1. Field of the Invention

This invention relates to circuit breakers for protecting electric power circuits and, more particularly, to such circuit breakers including a set of main contacts and a set of secondary contacts in series with the main contacts. The invention also relates to an electrical distribution panel including one or more circuit breakers having a set of main contacts and a set of secondary contacts in series with the main contacts and, in particular, to such an electrical distribution panel which monitors such circuit breakers.

2. Background Information

Circuit breakers are used to protect electrical circuitry from damage due to an overcurrent condition, such as an overload condition or a relatively high-level short circuit condition.

Circuit breakers used in residential and light commercial applications are commonly referred to as miniature circuit breakers because of their limited size. Such circuit breakers typically have a pair of separable contacts opened and closed by a spring biased operating mechanism. A thermal-magnetic trip device actuates the operating mechanism to open the separable contacts in response to persistent overcurrent conditions and to short circuits. Usually, circuit breakers of this type for multiple circuits within the residence or commercial structure are mounted together within a load center or panelboard, which may be located in a basement or other remote location. In some applications, it has been found convenient to use the circuit breakers for other purposes than just protection, for instance, for load shedding. It is desirable to be able to perform this function remotely, and even automatically, such as with a computer.

Circuit breakers typically provide status feedback by a visual indication only (e.g., by the position of the circuit breaker handle, by an indication window).

Some circuit breakers employ a status contact for reporting the status of the circuit breaker's separable contacts. For example, electrical switching devices may optionally include an auxiliary connection or an auxiliary switch located therein to externally indicate the status of the device. Such an auxiliary connection may include, for example, a connection from an internal auxiliary switch to a bell alarm and/or other external circuits for enunciating and/or monitoring the open/closed/tripped status of the electrical switching device.

U.S. Pat. Nos. 5,301,083 and 5,373,411 describe a remotely operated circuit breaker, which introduces a second pair of switching relay contacts in series with the main separable contacts. The main contacts still interrupt the overcurrent, while the secondary contacts perform the discretionary switching operations (e.g., load shedding). The secondary contacts are controlled by a solenoid, which is spring biased to close the contacts. Feedback circuitry, including normally open and normally closed auxiliary feedback contacts, provides a status indication of the condition of the secondary contacts.

Known circuit breakers of such types only provide the status of the switching contacts. There is a need, therefore, to also provide the status of the main contacts.

A panelboard holds a plurality of electrical switching devices, each of which is connected between one or more power sources and a separate load. An example of an external computer for a panelboard is disclosed in U.S. Pat. No. 4,918,566. It is also known to employ a computer within a panelboard.

It is known to employ electronic control, such as a computer, for controlling the solenoids of a plurality of circuit breakers in a panelboard. It is also known to employ the computer to monitor the status of the circuit breakers in a panelboard from the status contacts.

Typically, there are significant space limitations in relatively small circuit breakers. Normally, there is insufficient room for an extra status-reporting wire on the circuit breaker housing due to the significant thickness of UL-approved insulated wire that is required for external wiring. Furthermore, in view of the typical count of circuit breakers in a panelboard, it is undesirable to carry an extra status-reporting wire for each circuit breaker in the panelboard.

There is a need, therefore, for an improved circuit breaker that reports the status of both the main and relay switching contacts.

There is a further need for such a remotely controllable circuit breaker which is simple and economical.

There is a still further need for an improved electrical distribution panel that monitors the status of both main and relay switching contacts of its circuit breakers.

SUMMARY OF THE INVENTION

These needs and others are satisfied by the invention, which is directed to a circuit breaker, which includes an input terminal electrically connected to main and secondary auxiliary switches; an output terminal; a first circuit element electrically connected between the main auxiliary switch and the output terminal; and a second circuit element electrically connected between the secondary auxiliary switch and the output terminal. In this manner, the user is able to distinguish between a remote operation that opens or closes the secondary contacts from the opening or closing of the main contacts. Furthermore, this permits four different remote statuses to be communicated to an electrical distribution panel, such as a panelboard, by using a conventional input voltage in combination with a single sensing lead for each circuit breaker in the panelboard.

As one aspect of the invention, a circuit breaker comprises: a first set of separable contacts; a first operating mechanism for operating the first set of separable contacts; a second set of separable contacts in series with the first set of separable contacts; a second operating mechanism for operating the second set of separable contacts; a first auxiliary switch responsive to the first operating mechanism; a second auxiliary switch responsive to the second operating mechanism, the second auxiliary switch electrically connected to the first auxiliary switch; a first terminal electrically connected to the first and second auxiliary switches; a second terminal; a first circuit element electrically connected between the first auxiliary switch and the second terminal; and a second circuit element electrically connected between the second auxiliary switch and the second terminal.

The first circuit element may be a first resistance element, and the second circuit element may be a different second resistance element. Preferably, the first resistance element has a first resistance, and the second resistance element has a second resistance which is about two times the first resistance.

The first circuit element may be a first diode having a first polarity; and the second circuit element may be a second diode having a different second polarity. Preferably, the first diode has a cathode electrically connected to the second terminal; and the second diode has an anode electrically connected to the second terminal.

As another aspect of the invention, an electrical distribution panel comprises: a circuit breaker comprising: a first set of separable contacts having an open state and a closed state, a first auxiliary switch responsive to the open and closed states of the first set of separable contacts, a second set of separable contacts in series with the first set of separable contacts, the second set of separable contacts having an open state and a closed state, a second auxiliary switch responsive to the open and closed states of the second set of separable contacts, the second auxiliary switch electrically connected to the first auxiliary switch, an input terminal electrically connected to both of the first and second auxiliary switches, an output terminal, a first circuit element electrically connected between the first auxiliary switch and the output terminal, and a second circuit element electrically connected between the second auxiliary switch and the output terminal; an enclosure housing the circuit breaker; a power source energizing the input terminal of the circuit breaker, the power source having a common reference; a bridge rectifier electrically connected between the output terminal and the common reference of the power source, the bridge rectifier having an output; and means for determining one of four states from the output of the bridge rectifier based upon four corresponding states of the first and second auxiliary switches of the circuit breaker and the open and closed states of the first and second sets of separable contacts.

As a further aspect of the invention, an electrical distribution panel comprises: a plurality of circuit breakers each of which comprises: a first set of separable contacts having an open state and a closed state, a first auxiliary switch having two states responsive to the open and closed states of the first set of separable contacts, a second set of separable contacts in series with the first set of separable contacts, the second set of separable contacts having an open state and a closed state, a second auxiliary switch having two states responsive to the open and closed states of the second set of separable contacts, the second auxiliary switch electrically connected to the first auxiliary switch, an input terminal electrically connected to both of the first and second auxiliary switches, an output terminal, a first circuit-element electrically connected between the first auxiliary switch and the output terminal, and a second circuit element electrically connected between the second auxiliary switch and the output terminal; an enclosure housing the circuit breakers; a power source energizing the input terminal of the circuit breakers, the power source having a common reference; and means for determining one of four states from the output terminal of each of the circuit breakers based upon the two states of the first auxiliary switches and the two states of the second auxiliary switches of each of the circuit breakers.

As another aspect of the invention, an electrical distribution panel comprises: an N-pole circuit breaker comprising: N sets of first separable contacts, each of the first separable contacts having an open state and a closed state, a first auxiliary switch responsive to the open and closed states of one of the N sets of first separable contacts, N sets of second separable contacts each of which is in series with a corresponding one of the first separable contacts, each of the second separable contacts having an open state and a closed state, N second auxiliary switches each of which is responsive to the open and closed states of a corresponding one of the second separable contacts, an input terminal electrically connected to the first auxiliary switch and the second auxiliary switches, an output terminal, a first circuit element electrically connected between the first auxiliary switch and the output terminal, and N second circuit elements each of which is electrically connected between a corresponding one of the second auxiliary switches and the output terminal; an enclosure housing the circuit breaker; a power source energizing the input terminal of the circuit breaker, the power source having a common reference; and means for determining greater than N states from the output terminal based upon $2^N$ states of the first and second auxiliary switches of the circuit breaker.

A principal object of the invention is to provide state information for two or more different sets of separable contacts, each having an open state and a closed state, on a single output terminal.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

As employed herein, the term "electrical distribution panel" includes load centers, panelboards, and other indoor or outdoor panels for distributing electrical power to one or more loads.

The invention will initially be described as applied to a miniature single pole circuit breaker, although it will become apparent that it could be applied to other types of circuit breakers, such as circuit breakers having two, three, four or more poles as well.

Figure 1:
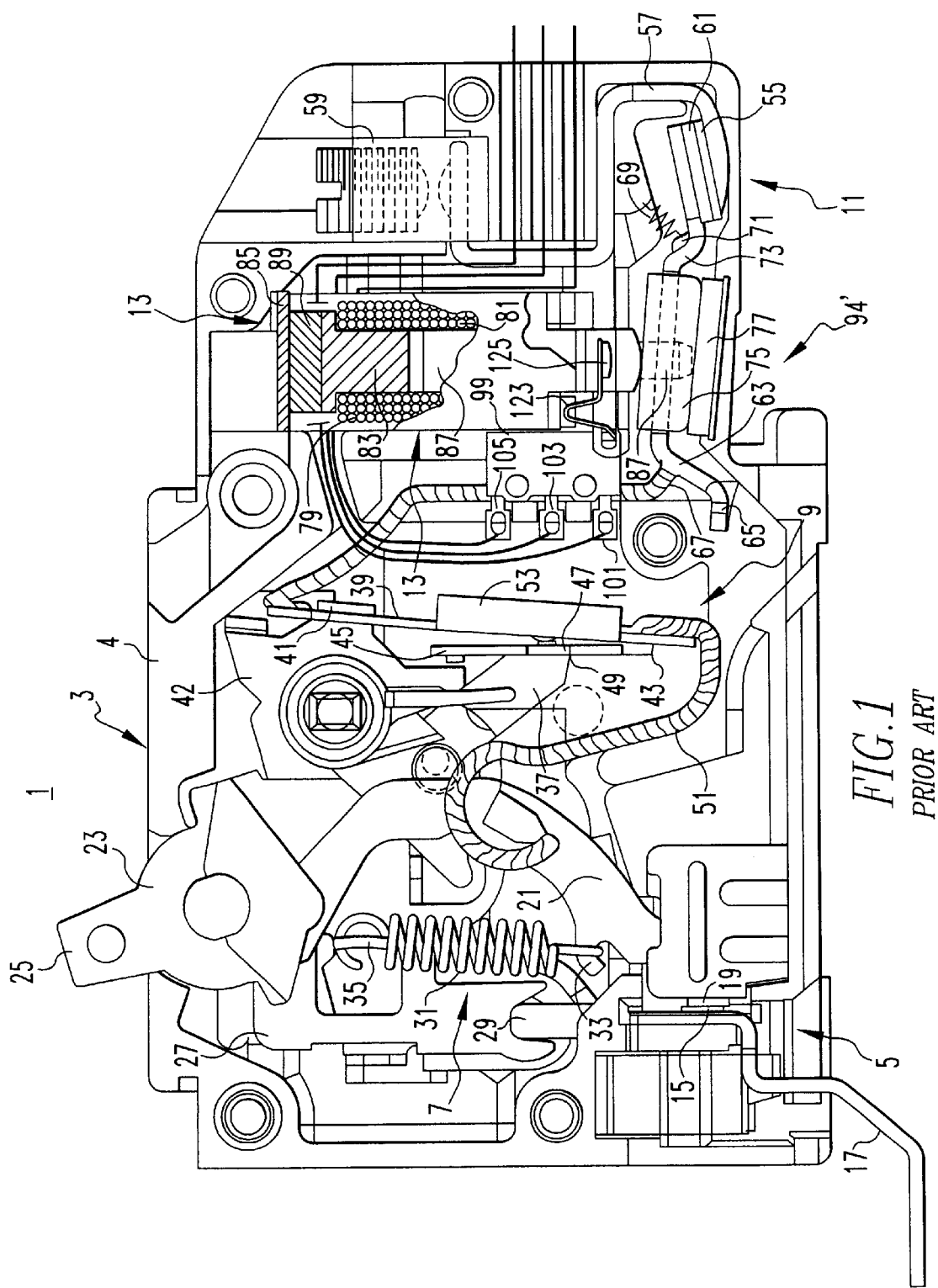
FIG. 1 is an elevational view of a remotely controllable circuit breaker shown with the cover removed and with the main contacts and secondary contacts closed.
Figure 2:
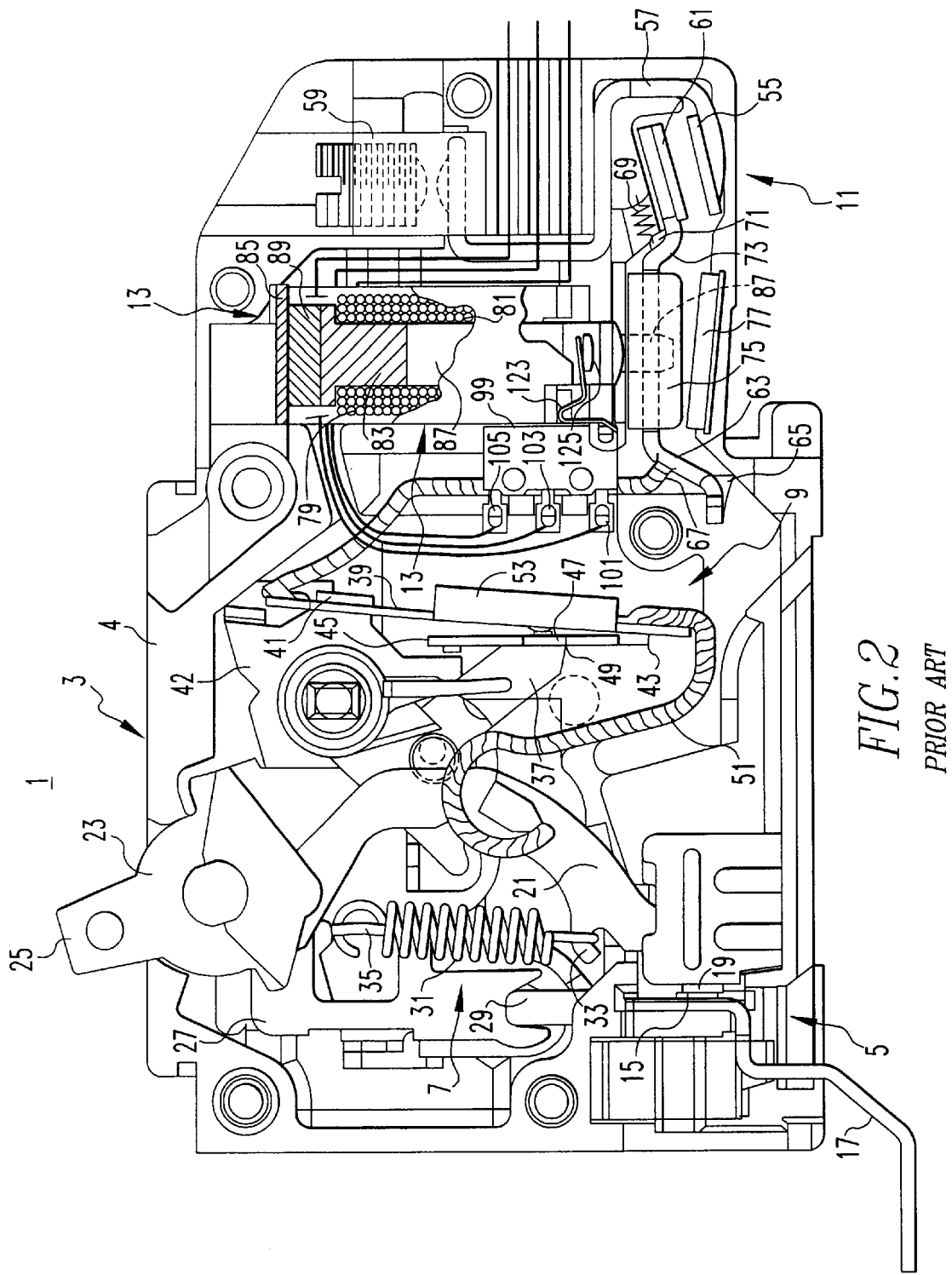
FIG. 2 is a view similar to that of FIG. 1 with the secondary contacts open.

FIGS. 1 and 2 show a miniature circuit breaker 1 including a molded housing 3 having a base portion 4 with the cover portion (not shown) of the housing removed. The basic components of the circuit breaker 1 are a set of main contacts 5, an operating mechanism 7 for opening the set of main contacts 5, and a thermal-magnetic trip device 9 which actuates the operating mechanism to trip the set of main contacts 5 open in response to certain overcurrent conditions. Further included are a set of secondary contacts 11 and an actuator, such as a magnetically latchable solenoid 13, which is remotely controllable to control the open and closed states of the set of secondary contacts 11.

The set of main contacts 5 includes a fixed contact 15 secured to a line terminal 17 and a moveable main contact 19 which is affixed to an arcuate contact arm 21 which forms part of the operating mechanism 7. The operating mechanism 7 is a well-known device, which includes a pivotally mounted operator 23 with an integrally molded handle 25. The operating mechanism also includes a cradle 27 pivotally mounted on a support 29 molded in the housing. With the handle 25 in the ON position, as shown in FIGS. 1 and 2, a spring 31 connected to a hook 33 on the contact arm 21 and a tab 35 on the cradle 27 holds the main contacts 5 closed. The spring 31 also applies a force with the set of main contacts 5 closed, as shown, to the cradle 27 which tends to rotate the cradle in a clockwise direction about the support 29. However, the cradle 27 has a finger 37, which is engaged by the thermal-magnetic trip device 9 to prevent this clockwise rotation of the cradle under normal operating conditions.

The thermal-magnetic trip device 9 includes an elongated bimetal 39 which is fixed at its upper end to a tab 41 on the metal frame 42 seated in the molded housing 3. Attached to the lower, free end of the bimetal 39 by a lead spring 43 is an armature 45. The armature 45 has an opening 47, which is engaged by a latching surface 49 on the finger 37.

The free end of the bimetal 39 is connected to the contact arm 21 by a flexible braided conductor 51 so that the load current of the circuit protected by the circuit breaker 1 passes through the bimetal. A persistent overcurrent heats the bimetal 39, which causes the lower end to move to the right with respect to FIGS. 1 and 2. If this overcurrent is of sufficient magnitude and duration, the latching surface 49 on the finger 37 is pulled out of engagement with the armature 45. This allows the cradle 27 to be rotated clockwise by the spring 31. The clockwise rotation of the cradle 27 moves the upper pivot point for the contact arm 21 across the line of force of the spring 31 so that the contact arm is rotated counter-clockwise, to open (not shown) the set of main contacts 5, as is well understood. This also results in the handle 25 rotating clockwise to an intermediate position (not shown) to indicate the tripped condition of the set of main contacts 5.

In addition to the armature 45, a magnetic pole piece 53 is supported by the bimetal 39. Very high overcurrents, such as those associated with a short circuit, produce a magnetic field which draws the armature 45 to the pole piece 53, thereby also releasing the cradle 27 and tripping the set of main contacts 5 open. Following either trip, the main set of contacts 5 are reclosed by moving the handle 25 fully clockwise, which rotates the cradle 27 counter-clockwise until the finger 37 relatches in the opening 47 in the armature 45. Upon release of the handle 25, it moves counter-clockwise slightly from the full clockwise position and remains there. With the cradle relatched, the line of force of the spring 31 is reestablished to rotate the contact arm 21 clockwise to close the set of main contacts 5 when the handle 25 is rotated fully counter-clockwise to the position shown in FIGS. 1 and 2.

The set of secondary contacts 11 includes a fixed secondary contact 55 which is secured on a load conductor 57 which leads to a load terminal 59. The set of secondary contacts 11 also includes a moveable secondary contact 61 which is fixed to a secondary contact arm 63 which at its opposite end is seated in a molded pocket 65 in the molded housing 3. The secondary contact arm 63 is electrically connected in series with the set of main contacts 5 by a second flexible braided conductor 67 connected to the fixed end of the bimetal 39. Thus, a circuit or load current is established from the line terminal 17 through the set of main contacts 5, the contact arm 21, the flexible braided conductor 51, the bimetal 39, the second flexible braided conductor 67, the secondary contact arm 63, the set of secondary contacts 11, and the load conductor 57 to the load terminal 59.

The set of secondary contacts 11 is biased to the closed state shown in FIG. 1 by a helical compression spring 69 seated on a projection 71 on an offset 73 in the secondary contact arm 63. As discussed in U.S. Pat. No. 5,301,083, the spring 69 is oriented such that the force that it applies to the secondary contact arm 63 tending to close the set of secondary contacts 11 is relaxed to a degree with the secondary contacts in the open position. This serves the dual purpose of providing the force needed to close the secondary contacts against rated current in the protected circuit and also reducing the force that must be generated by the magnetically latching solenoid 13 to hold the secondary contacts in the open state. In order for the set of secondary contacts 11 to withstand short circuit currents and allow the set of main contacts 5 to perform the interruption, the magnet force generated by the short circuit current causes an armature 75 mounted on the secondary contact arm 63 to be attracted to a pole piece 77 seated in the molded housing 3 thereby clamping the secondary contacts closed.

As shown by the partial sections in FIGS. 1 and 2, the actuator/solenoid 13 includes a first or close coil 79 and a second or open coil 81 concentrically wound on a steel core 83 supported by a steel frame 85. A plunger 87 moves rectilinearly within the coils 79 and 81. A permanent magnet 89 is seated between the steel core 83 and the steel frame 85.

The plunger 87 engages the secondary contact arm 63. When the close coil 79 is energized, a magnetic field is produced which drives the plunger downward to a first position which rotates the secondary contact arm 63 clockwise and thereby moves the set of secondary contacts 11 to the closed state. The secondary contacts 11 are maintained in the closed state by the spring 69. When it is desired to open the set of secondary contacts 11, the open coil 81 is energized which lifts the plunger 87 and with it the secondary contact arm 63 to a second position which opens the set of secondary contacts 11. With the plunger 87 in the full upward position as shown in FIG. 2, it contacts the steel core 83 and is retained in this second position by the permanent magnet 89. Subsequently, when the close coil 79 is energized, the magnetic field generated is stronger than the field generated by the permanent magnet and therefore overrides the latter and moves the plunger 87 back to the first, or closed position.

Figure 3:
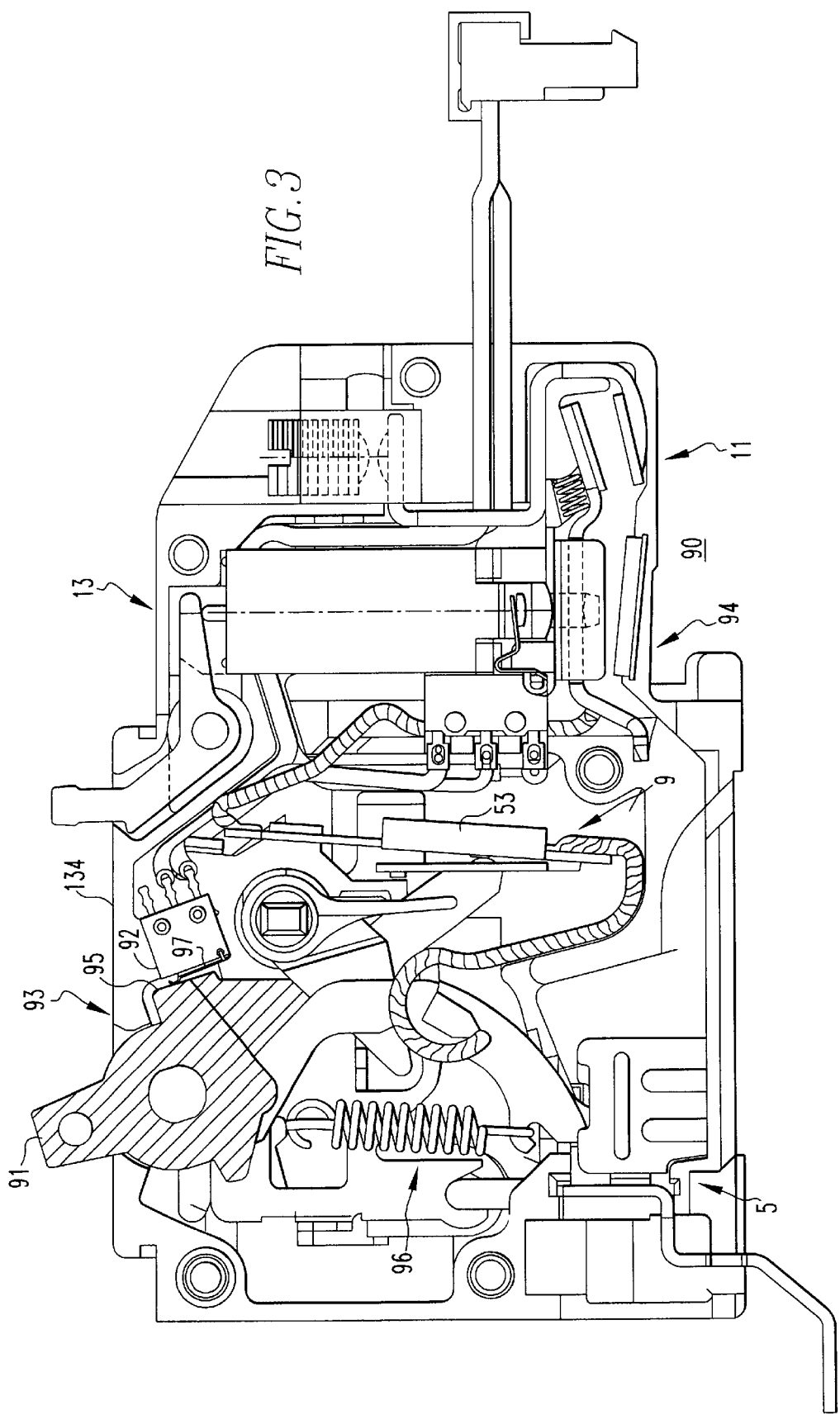
FIG. 3 is an elevational view of a remotely controllable circuit breaker in accordance with the invention in which the operating handle actuates the actuating lever of a microswitch in the handle on position.
Figure 4:
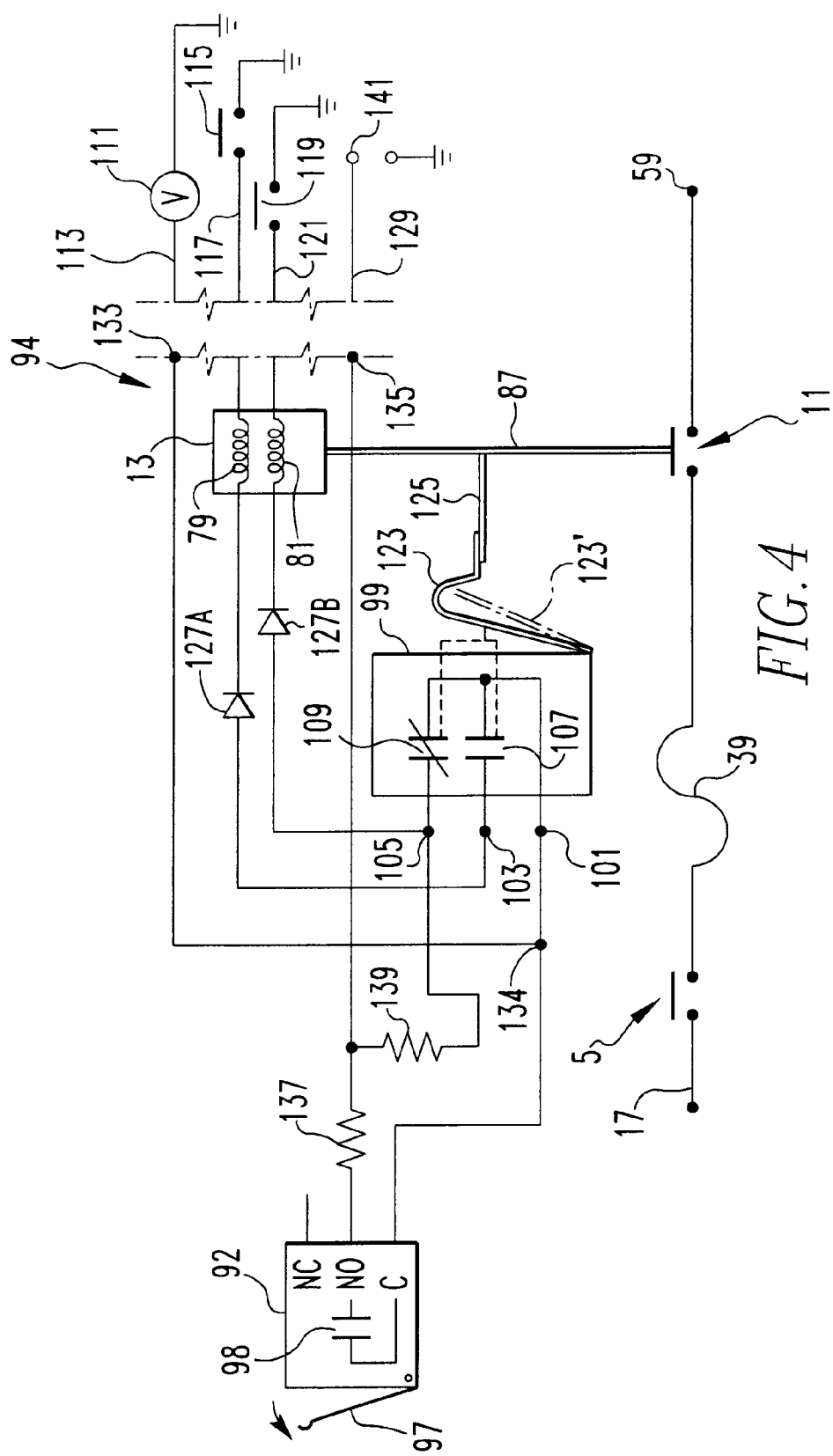
FIG. 4 is a schematic circuit diagram of a control circuit for the remotely controllable circuit breaker of FIG. 3.

FIG. 3 shows a remotely controllable circuit breaker 90 in accordance with the present invention. The circuit breaker 90 is similar to the circuit breaker 1 of FIGS. 1 and 2, expect that it includes the pivotally mounted operator handle 91, a switch such as the exemplary micro-switch 92, molded housing 93, and control and monitoring circuit 94 (as best shown in FIG. 4). The operator handle 91 has a surface 95, an ON position (shown in FIG. 3), an OFF position (not shown), and an intermediate tripped position (not shown). As is well known, the main separable contacts 5 are closed in the ON position of FIG. 3, and are open in the OFF and tripped positions, and the operator handle 91 is employed to open and close the separable contacts 5. As discussed in connection with FIGS. 1–2, the thermal-magnetic trip device 9 and/or the magnetic pole piece 53 release the operating mechanism 96 of FIG. 3 and the operator handle 91 to the tripped position (not shown).

The micro-switch 92 includes an actuator lever 97 movable between an actuated position (FIG. 3) and a non-actuated position (FIG. 4). The actuator lever 97 is adapted to engage the surface 95 of the operator handle 91 as shown in FIG. 3. The micro-switch 92 includes a normally open contact 98 (FIG. 4), which is closed in the actuated position of the micro-switch and is otherwise open in the non-actuated position. The surface 95 of the operator handle 91 engages and moves the actuator lever 97 to the actuated position in only the ON position (FIG. 3) of the operator handle. Otherwise, the actuator lever 97 is in the non-actuated position in the OFF position (FIG. 4) and the tripped position (not shown) of the operator handle 91. The exemplary micro-switch 92 also includes a normally closed contact (not shown), although the invention is applicable to any suitable switch having a single normally open or closed contact.

FIG. 4 shows a schematic circuit diagram of the control and monitoring circuit 94 for the circuit breaker 90 of FIG. 3. The circuit 94 is similar to a circuit 94' employed by the circuit breaker 1 of FIG. 1, except that the normally open contact 98 of the micro-switch 92 is employed in the feedback monitoring function as discussed below. The first and second or close and open coils 79, 81 of the magnetically latching solenoid 13 are remotely controlled by the circuit 94. This circuit 94 includes a switch or internal power cutoff device in the form of micro-switch 99, which has a common terminal 101 and first and second switched terminals 103,105. The micro-switch 99 includes a first contact 107 connected between the common terminal 101 and the first switched terminal 103, and a second contact 109 connected between the common terminal 101 and the second switched terminal 105. In the form of the circuit shown, the first contact 107 of the micro-switch 99 is a normally open contact and the second contact 109 is a normally closed contact. The common terminal 101 of the micro-switch 99 is connected to a remotely located voltage source 111 through a lead 113. The first or close coil 79 of the solenoid 13 is connected between the first switched terminal 103 of the micro-switch 99 and a remotely located second or close switch 115 through diode 127A and through a lead 117. The other side of the close switch 115 is connected to ground. Similarly, the second or open coil 81 is connected between the second switched terminal 105 of the micro-switch 99 and a third or open switch 119 through diode 127B and through lead 121. Again, the other side of the switch 119 is grounded.

The micro-switch 99 has an operating member in the form of actuator lever 123, which is engaged by a projection 125 on the plunger 87 of the solenoid 13. When the solenoid 13 is latched is in the upward or second position (as shown in FIG. 4) so that the second set of contacts 11 is open, the micro-switch 99 is actuated and the first or normally open contact 107 is closed while the normally closed contact 109 is open. Thus, the voltage source 111 is connected to enable the close coil 79 so that whenever the remote close switch 115 is closed, the coil 79 will be energized. A rectifier circuit is implemented by exemplary diodes 127A,127B from terminals 103,105, respectively. In this manner, only voltage of the proper polarity can energize the coil 79 to effect downward movement of the plunger 87. Also, with the diodes 127A,127B, an AC voltage as well as a DC voltage can be used for the voltage source 111. The diodes 127A,127B will provide half wave rectification of any AC signal. Since the solenoid 13 latches in the open and closed positions, only momentary power is needed to open and close the set of secondary contacts 11. This momentary power can be provided by an AC source, a DC source or a pulse source. Alternatively, in place of the diodes 127A,127B, a suitably polarized diode (not shown) having its cathode electrically connected to the terminal 101 can be provided in the lead 113.

When the close coil 79 is energized, the plunger 87 is driven downward to its first position which closes the set of secondary contacts 11 and allows the actuator lever 123 of the micro-switch 99 to move to the closed position 123' shown in phantom in FIG. 4. This results in closure of the normally closed contact 109 and opening of the normally open contact 107. The set of secondary contacts 11 remains latched in the closed position due to the spring 69. With the normally closed contact 109 now closed, the open coil 81 is enabled by application of the voltage from the voltage source 111. However, no current flows through the open coil 81 until the remote open switch 119 is closed to complete the circuit for the open coil.

As the set of secondary contacts 11 is latched in either the open state or the closed state, it is not necessary, to provide continuous power from the voltage source 111 to maintain them in either state. Accordingly, momentary signals can be used to control operation of the solenoid 13. The remote close and open switches 115 and 119 can be manual switches or automatic switches, such as output contacts of a computer system. Similarly, the status terminals 141 can be input terminals on such a computer-controlled system.

In accordance with the present invention, the normally closed contact 109, which is closed when the secondary contacts 11 are closed, is electrically connected in series with the normally open contact 98 of the first micro-switch 92. That contact 98 is closed when the actuator lever 97 is actuated (FIG. 3) and the set of main contacts 5 is closed. In order to provide an indication of the status of both the main contacts 5 and the secondary contacts 11 on the single status line 129, a first terminal 133 is electrically connected at node 134 to the contact 98 of the first micro-switch 92 and the contact 109 of the second micro-switch 99. A second terminal 135 for the status line 129 is provided. A first circuit element, such as the exemplary resistor 137, is electrically connected between the contact 98 of the first micro-switch 92 and the second terminal 135, and a second circuit element, such as the exemplary resistor 139, is electrically connected between the contact 109 and that second terminal 135. In the exemplary embodiment, the resistor 137 has a first resistance (e.g., 2 KΩ) and the second resistor has a different second resistance (e.g., 4 KΩ), which is about two times the first resistance. The status line 129 therefore provides a voltage signal from voltage source 111 relative to ground at status terminals 141, which is indicative of the four possible states (i.e., OFF/OFF, OFF/ON, ON/OFF, ON/ON) of the two sets of the contacts 5,11. In this example, the tripped and OFF states of the separable contacts 5 are equivalent, since in both cases those contacts are open.

Figure 5:
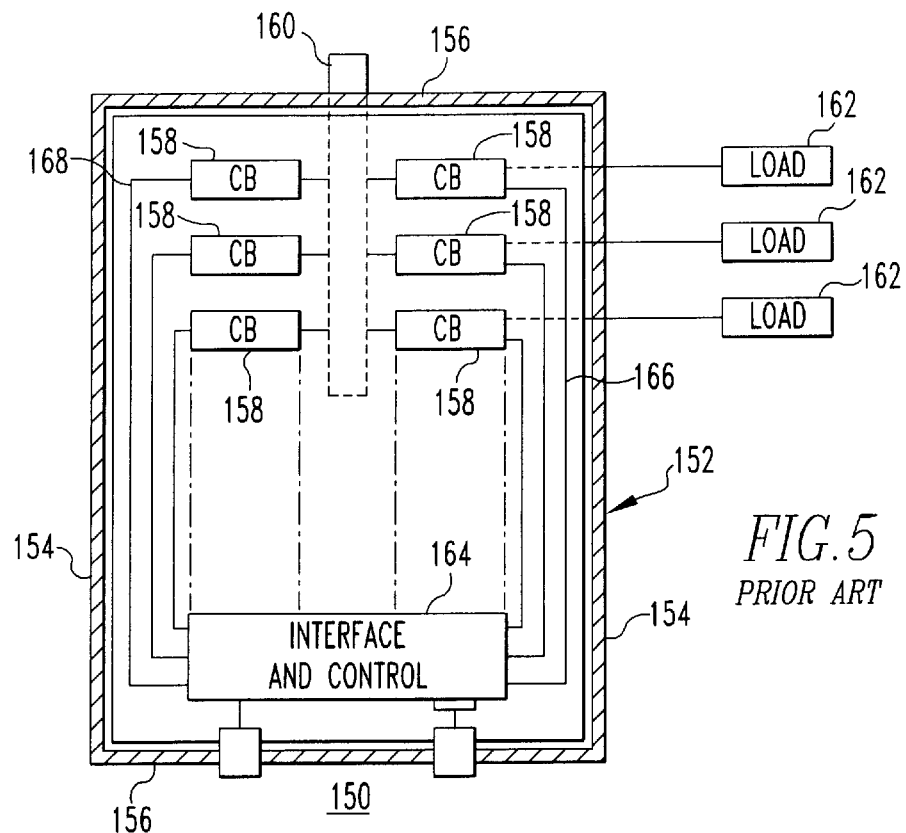
FIG. 5 is a block diagram of a panelboard having a plurality of circuit breakers and providing electronic control and monitoring of the circuit breakers.

U.S. Pat. No. 5,705,862, which is incorporated herein by reference, discloses a configurable panelboard for a plurality of circuit breakers. As shown in FIG. 5, a panelboard 150 includes a box or enclosure 152 having opposite sidewalls 154 and end walls 156. A plurality (e.g., up to 42 or more) circuit breakers (CB) 158 are housed by the enclosure 152. Each circuit breaker 158 is connected to a line bus bar 160 and a separate load 162 (as shown with three of the circuit breakers 158). The circuit breakers 158 include solenoid operated circuit breakers, which are interconnected with a suitable interface and control circuit 164 by separate conductor sets, such as conductor sets 166,168, for each of the circuit breakers 158. The circuit 164 provides electronic control and monitoring of the circuit breakers 158, although external electronic control by an external computer (not shown) may also be employed.

A circuit to one of the loads 162 may be opened or closed remotely by the corresponding solenoid operated circuit breaker 158 in response to operation of the electronic control acting through the circuit 164. For example, each of the conductor sets 166,168 may include a coil lead (not shown), which facilitates sending open and close control messages from the circuit 164 to the corresponding circuit breaker 158, and a separate status line (not shown) which provides a report-back function to monitor the open or closed status of the circuit breaker 158 as controlled by its solenoid.

Figure 6:
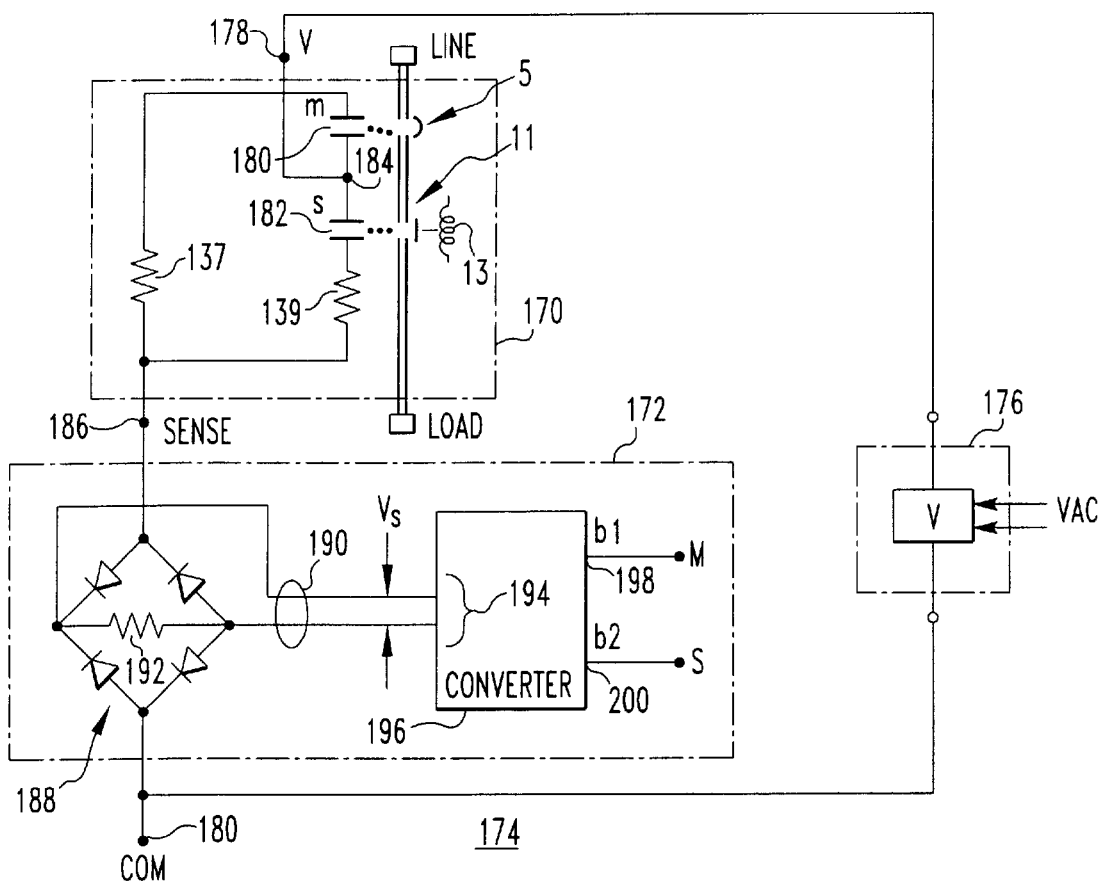
FIG. 6 is a block diagram of a circuit breaker and a panelboard monitoring circuit in accordance with an embodiment of the invention.

FIG. 6 shows a remotely operated circuit breaker 170 and a panelboard monitoring circuit 172 for an electrical distribution panel, such as the exemplary panelboard 174. The panelboard 174 has a similar enclosure for housing the circuit breaker 170 therein as the panelboard 150 of FIG. 5. In accordance with the present invention, the panelboard 174 includes a suitable power source 176 to energize the input terminal 178 of the circuit breaker 170 with a suitable control voltage V (e.g., any suitable DC or AC voltage, such as, for example, 24 VAC) with respect to a common reference (COM) 180. The circuit breaker 170 is similar to the circuit breaker 90 of FIG. 3. The circuit breaker 170 includes a first auxiliary switch (m) 180 responsive to the operating mechanism 96 (FIG. 3) and a second auxiliary switch (s) 182 responsive to the operating solenoid 13. The second auxiliary switch 182 is electrically connected in series with the first auxiliary switch 180, with the input terminal 178 being electrically connected to both auxiliary switches at node 184. In this example, the auxiliary switches 180,182 have exemplary normally open contacts, which are closed whenever the respective separable contacts 5,11 are closed, although normally closed contacts or combinations of normally open and/or normally closed contacts may be employed. The circuit breaker 170 also includes the resistors 137,139, which are electrically connected between the respective auxiliary switches 180,182 and the single output terminal (SENSE) 186.

The exemplary monitoring circuit 172 for the circuit breaker 170 includes a bridge rectifier 188 electrically connected between the output terminal 186 and the common reference 180 of the power source 176, which in this embodiment applies a 24 VAC voltage between the terminals 178,180. The two outputs 190 of the bridge rectifier 188 have a resistor 192 electrically connected therebetween and provide a voltage signal, $V_S$, to the input 194 of a suitable converter circuit 196. The function of the converter circuit 196 is to determine one of four states on its two outputs 198 (b1) and 200 (b2) from the output 190 of the bridge rectifier 188 based upon the four corresponding states of the two auxiliary switches 180,182 of the circuit breaker 170 and, thereby, determine the corresponding open (i.e., OFF, tripped) and closed (ON) states of the main contacts 5 and the open and closed states of secondary contacts 5.

In the exemplary embodiment, the auxiliary switches 180,182 are internally wired to two different resistors 137,139 having different resistances (e.g., 2 KΩ, 4 KΩ, respectively), in order to provide a different current value from the circuit breaker 170 through the SENSE terminal 186 depending upon the status of the main and switching contacts 5,11. In the exemplary panelboard 174, the AC current value from the terminal 186 is rectified by the bridge 188 to develop a pulsed DC voltage across the resistor 192. This provides one of four different peak voltage levels corresponding to the four peak current values of 0 mA (OFF/OFF), 6 mA (OFF/ON), 12 mA (ON/OFF), and 18 mA (ON/ON) relating to the four possible states of the auxiliary switches 180,182. In turn, the converter circuit 196 outputs a two-bit digital output including an output 198 (M) corresponding to the state (i.e., 1=ON, 0=OFF/tripped) of the main contacts 5 and an output 200 (S) corresponding to the state (i.e., 1=ON, 0=OFF) of the secondary contacts 11. For example, the converter 196 may be a plural bit analog-to-digital converter (ADC) that employs any suitable technique (e.g., a charge capacitor, sampling the input 194 to determine the average voltage, sampling the input 194 to determine the peak voltage) in order to determine the outputs 198,200. Alternatively, the power source 176 may be replaced by a suitable DC power source (not shown) and the bridge 188 may optionally be removed.

Figure 7:
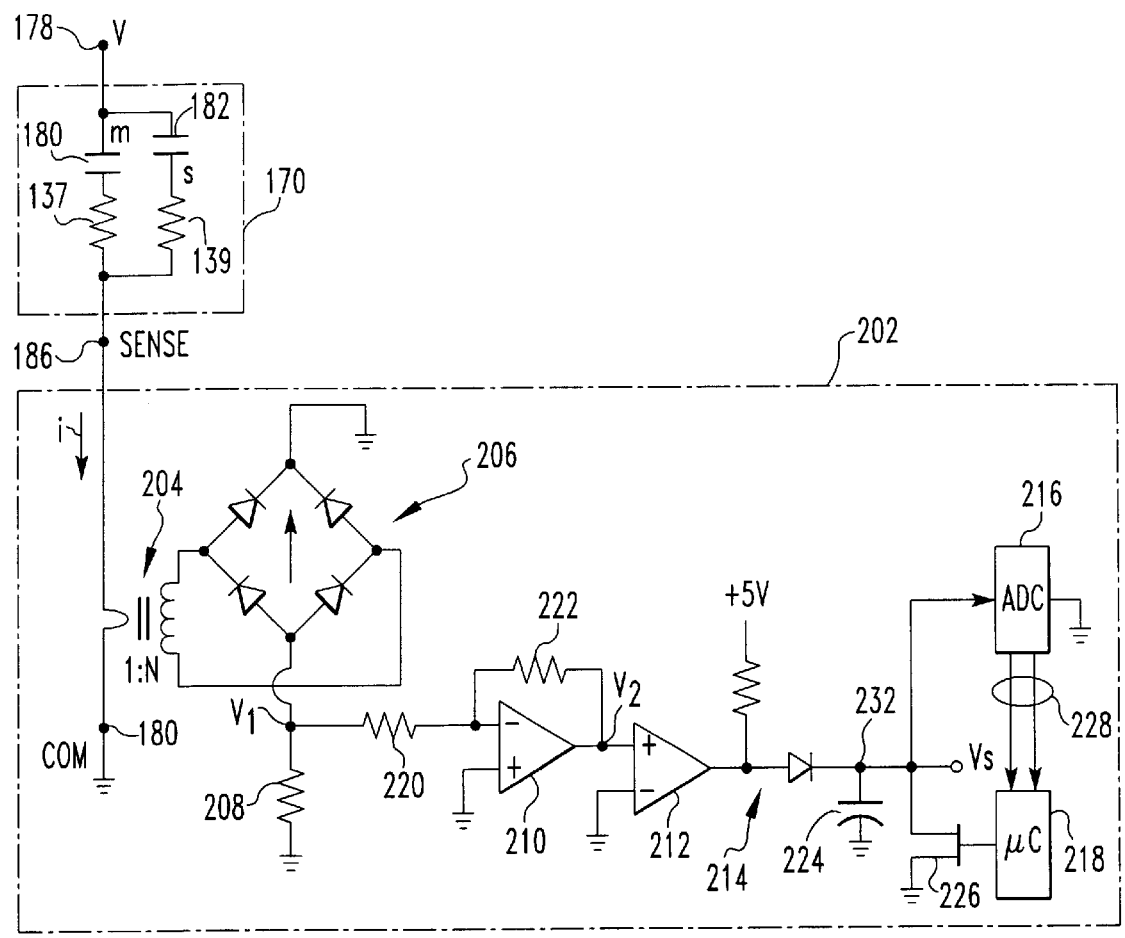
FIG. 7 is a block diagram of a circuit breaker and a panelboard monitoring circuit in accordance with another embodiment of the invention.

FIG. 7 shows the circuit breaker 170 and another panelboard monitoring circuit 202 including an exemplary toroidal current sensor 204, bridge rectifier 206, burden resistor 208, inverting operational amplifier 210, comparator 212, peak detector circuit 214, ADC 216 and microcomputer (μC) 218. For example, the current sensor or transformer 204 has an input electrically connected between the output terminal 186 of the circuit breaker 170 and the common reference 180 of the AC power source 176 of FIG. 6. The current transformer 204 has an output which divides the current (i) from the circuit breaker 170 by a factor of N (e.g., N=100). The bridge 206 has an input electrically connected to the output of the current transformer 204 and an output that directs the rectified divided current through the burden resistor 208 in order to provide a negative pulsating DC voltage ($V_1$) thereacross. The voltage ($V_1$) is suitably amplified and inverted by the operational amplifier 210 in combination with resistors 220,222 to provide a suitable positive pulsating DC voltage ($V_2$) at the positive input of the comparator 212. The peak detector circuit 214 then generates a suitable DC voltage ($V_S$) (e.g., 0 VDC, 1 VDC, 2 VDC, 3 VDC corresponding to the four possible states (OFF/OFF, OFF/ON, ON/OFF, and ON/ON) of the auxiliary switches 180, 182) across capacitor 224, which voltage is input by ADC 216 for conversion and reading by the μC 218. After the DC voltage ($V_s$) is converted and read, the μC 218 employs field effect transistor (FET) 226 to discharge the capacitor 224 in preparation for a subsequent analog to digital conversion. In this example, two of the outputs 228 of the ADC 216 would correspond to the outputs 198 (b1) and 200 (b2) of FIG. 6, with b1=2 VDC=M and b2=1 VDC=S.

Figure 8:
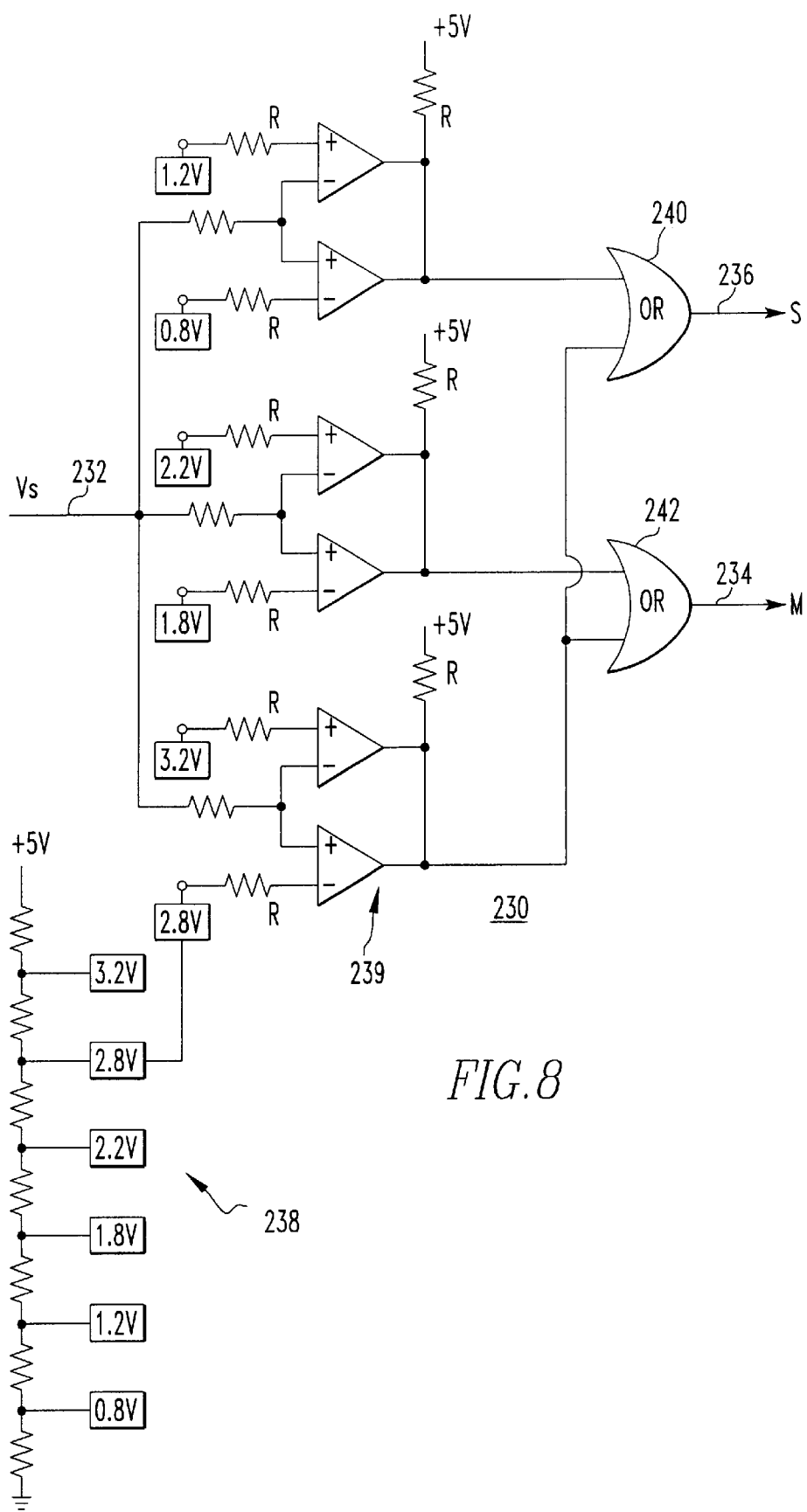
FIG. 8 is a block diagram of a panelboard monitoring circuit in accordance with another embodiment of the invention.

FIG. 8 shows an exemplary four-level comparator circuit 230 suitable for operation as the converter 196 of FIG. 6 or in place of the ADC 216 of FIG. 7. For example, if the DC voltage ($V_s$) of FIG. 7 is input at 232, the two outputs 234,236 of the circuit 230 correspond to the outputs 198 (b1) and 200 (b2) of FIG. 6, with b1=2 VDC=M and b2=1 VDC=S. A divider circuit 238 provides an exemplary set of reference voltage levels for the six comparators 239. Exemplary voltage ranges of 1±0.2 VDC, 2±0.2 VDC, and 3±0.2 VDC are provided, although any suitable voltages and tolerance ranges may be employed. The OR gate 240 has a true (=1) output 236 for the values (1 VDC, 3 VDC) of the DC voltage ($V_s$) when the secondary contacts 11 of FIG. 6 are closed, and the OR gate 242 has a true (=1) output 234 for the values (2 VDC, 3 VDC) of the DC voltage ($V_s$) when the main contacts 5 of FIG. 6 are closed. Otherwise, both of the outputs 234,236 are false (=0) for the value (0 VDC) of the DC voltage ($V_s$) when both of the main and separable contacts 5,11 are open.

Figure 9:
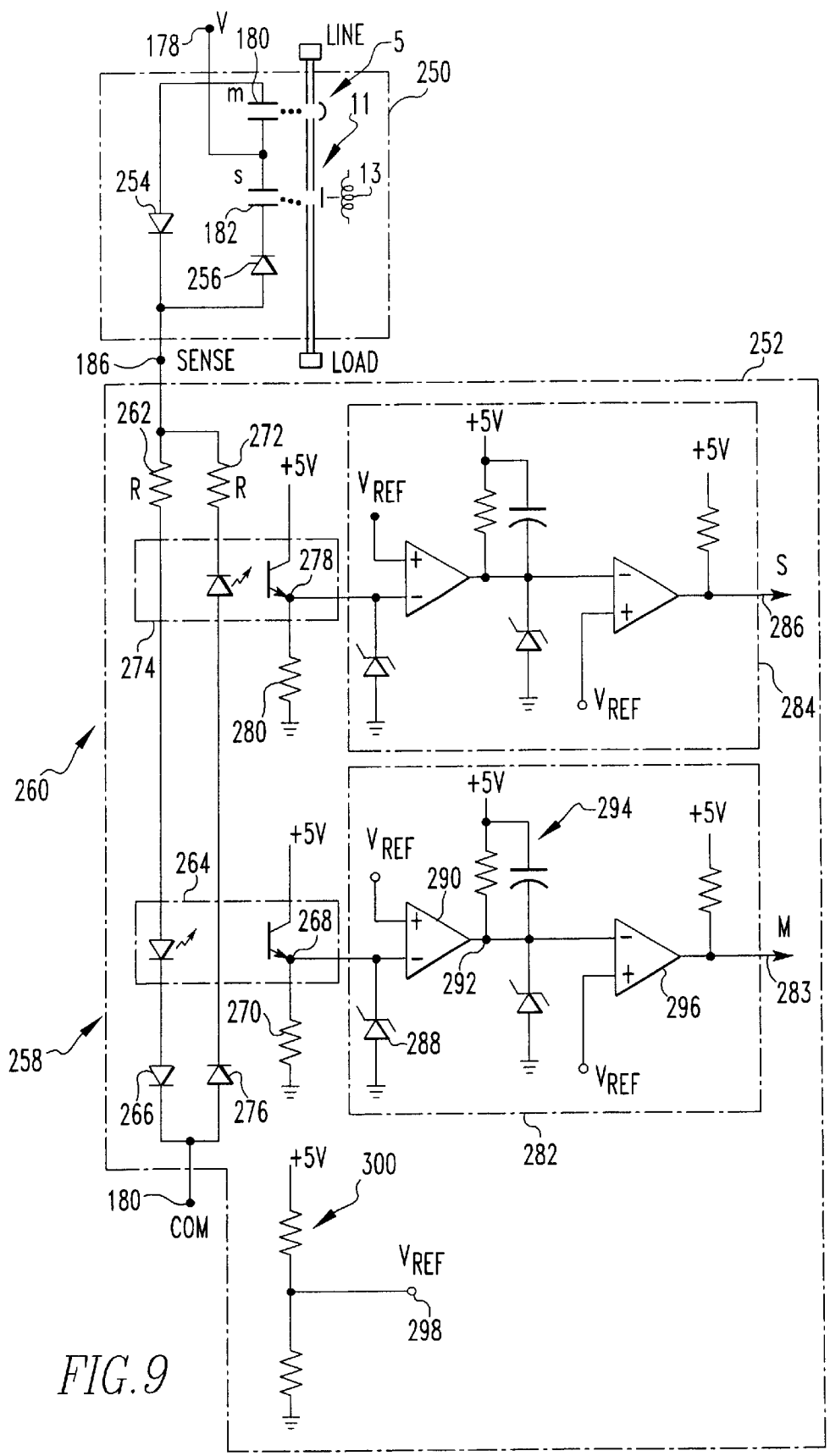
FIG. 9 is a block diagram of a circuit breaker and a panelboard monitoring circuit in accordance with another embodiment of the invention.

FIG. 9 shows another circuit breaker 250 and a panelboard monitoring circuit 252. The circuit breaker 250 is similar to the circuit breaker 170 of FIG. 6, except that the resistors 137,139 are replaced by diodes 254,256, respectively. The diode 254 has its anode electrically connected to the auxiliary contact 180 and its cathode electrically connected to the SENSE terminal 186, while the diode 256 has its cathode electrically connected to the auxiliary contact 182 and its anode electrically connected to the SENSE terminal 186. Whenever the circuit 252 is employed with a suitable AC voltage (V) at input terminal 178, the circuit 252 detects positive and/or negative waveforms of the input AC signal. The diodes 254,256, in turn, output one of four different current waveforms, which flow with respect to the sense terminal 186 as follows: (1) zero current whenever both the main and switching contacts 5,11 are open; (2) a half-wave, positive polarity when the main contacts 5 are closed and the switching contacts 11 are open; (3) a half-wave, negative polarity when the main contacts 5 are open and the switching contacts 11 are closed; and (4) a full wave signal when both of the main and switching contacts 5,11 are closed.

The circuit 252 includes a first current detector 258 having a first polarity (i.e., current flowing from the SENSE terminal 186) corresponding to the polarity of the first diode 254, and a second current detector 260 having a second polarity (i.e., current flowing into the SENSE terminal 186) corresponding to the second polarity of the second diode 256. The first current detector 258 includes the series combination of a resistor 262, a first opto-coupler 264 and a diode 266 having the same polarity as the diode 254. The first opto-coupler 264 detects current flowing with the first polarity from the first diode 254 and has an output 268 which provides a voltage across resistor 270 upon detecting sufficient current flowing from the terminal 186. The second current detector 260 includes the series combination of a resistor 272, a second opto-coupler 274 and a diode 276 having the same polarity as the diode 256. The second opto-coupler 274 detects current flowing with the second polarity to the second diode 256 and has an output 278 which provides a voltage across resistor 280 upon detecting sufficient current flowing into the terminal 186.

The first current detector 258 also includes a circuit 282 having a digital output 283 corresponding to a half-wave polarity voltage at the output 268 of the first opto-coupler 264. The second current detector 260 similarly includes a circuit 284 having a digital output 286 corresponding to a half-wave polarity voltage at the output 278 of the second opto-coupler 274. Except for the input and output connections, the circuits 282,284 are otherwise identical. The circuits 282 is a representative circuit and includes a zener diode 288, a first comparator 290 having a negative input electrically connected to the output 268 of the first opto-coupler 264 and also having an output 292, a filter circuit 294 electrically connected to the output 292 of the first comparator 290; and a second comparator 296 having a negative input electrically connected to the filtered output 292 of the first comparator 290 and also having the output 283 with the digital signal (M) corresponding to the half-wave polarity voltage at the output 268 of the first opto-coupler 264. The positive inputs of the first and second comparators 290,296 are electrically connected to the output 298 of a divider circuit 300, which provides a suitable reference voltage.

The current waveform, which flows in and/or out of the SENSE terminal 186, has one of the four possibilities. The opto-couplers 264,274 optically couple corresponding half wave portions of that waveform to an isolated logic level circuit at outputs 268,278. The isolated voltages are then fed to the two-stage comparators 290,296. The filter circuit 294 at the output 292 of the first comparator 290 includes an RC network having an exemplary 20 ms time constant. The RC network stretches the corresponding half-wave signal in order to provide a level digital output state of either 5 V or 0 V on the corresponding M output terminal 283. In turn, the panelboard controller, such as the μC 218 of FIG. 7, reads the digital values on the output terminals 283,286. The M output terminal 283 has a true or 5 V level whenever the circuit 258 detects the half-wave, positive polarity and the main contacts 5 are closed. Otherwise, the M output terminal 283 has a false or 0 V level whenever the main contacts 5 are open (i.e., OFF, tripped). The S output terminal 286 has a true or 5 V level whenever the circuit 260 detects the half-wave, negative polarity and the secondary contacts 11 are closed. Otherwise, the S output terminal 286 has a false or 0 V level whenever the secondary contacts 11 are open.

Figure 10:
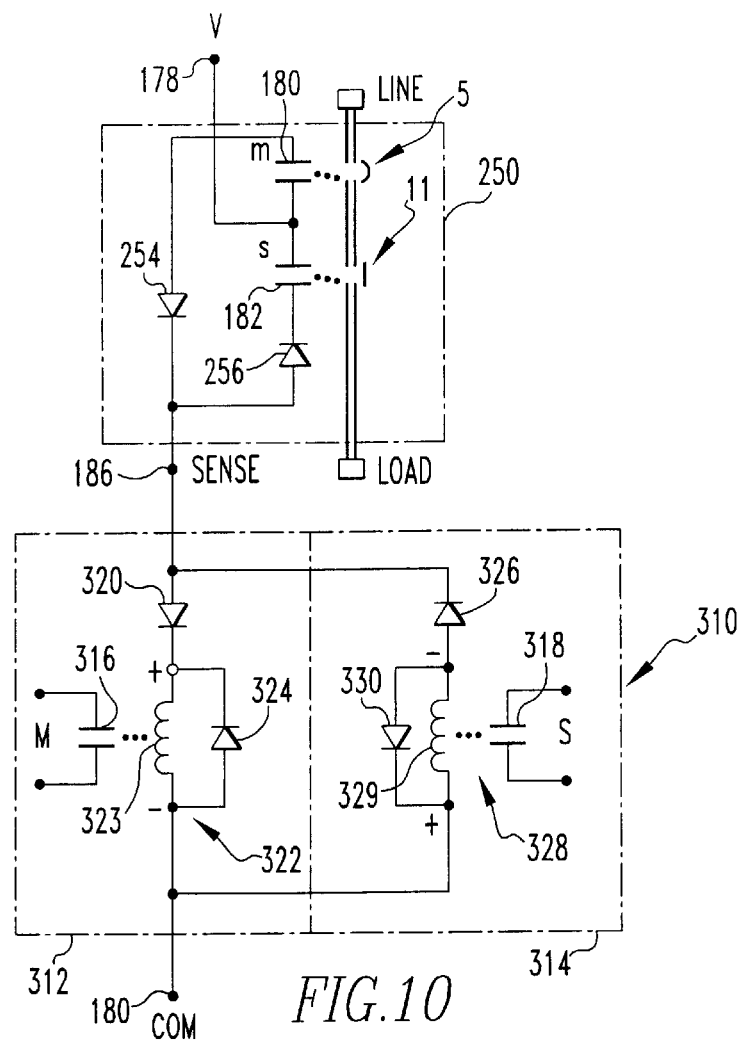
FIG. 10 is a block diagram of a circuit breaker and a panelboard monitoring circuit in accordance with another embodiment of the invention.

FIG. 10 shows the circuit breaker 250 of FIG. 9 and another panelboard monitoring circuit 310, which includes current detector circuits 312 and 314 generating an M output contact 316 and an S output contact 318, respectively, from the current flowing from and/or to the SENSE terminal 186. The circuit 312 includes a diode 320 having the same polarity as the diode 254 of the circuit breaker 250, and a relay 322 having its coil 323 in series with the diodes 254,320 with the current flowing from the SENSE terminal 186 flowing into the positive terminal of the coil 323. The M output contact 316 is closed in response to current flowing through the diodes 254,320 and the coil 323 of the relay 322. Preferably, the relay 323 is a relatively small, PCB-mounted electromechanical non-latching relay, which employs a magnet assist and operates on half-wave current flowing through the diodes 254,320. A freewheeling diode 324 is electrically connected in parallel with the coil 323, with opposite polarity with respect to the diodes 254,320, in order to provide sufficient current during the missing half-wave portion of the AC waveform and, thus, ride through and hold in the associated contact 316 in the event of a positive half-wave signal.

The circuit 314 includes a diode 326 having the same polarity of the diode 256 of the circuit breaker 250 and a relay 328 having its coil 329 in series with the diodes 256,326 with the current flowing into the positive terminal of the coil 329 flowing to the SENSE terminal 186. The S output contact 318 is closed in response to current flowing through the diodes 256,326 and the coil 329 of the relay 328. A freewheeling diode 330 is electrically connected in parallel with the coil 329, with opposite polarity with respect to the diodes 256,326, in order to provide sufficient current during the missing half-wave portion of the AC waveform and, thus, ride through and hold in the associated contact 318 in the event of a negative half-wave signal. The monitoring circuit 310, thus, provides the M output contact 316 and the S output contact 318 which mimic the status of the auxiliary contacts 180 and 182, respectively, of the circuit breaker 250.

Figure 11:
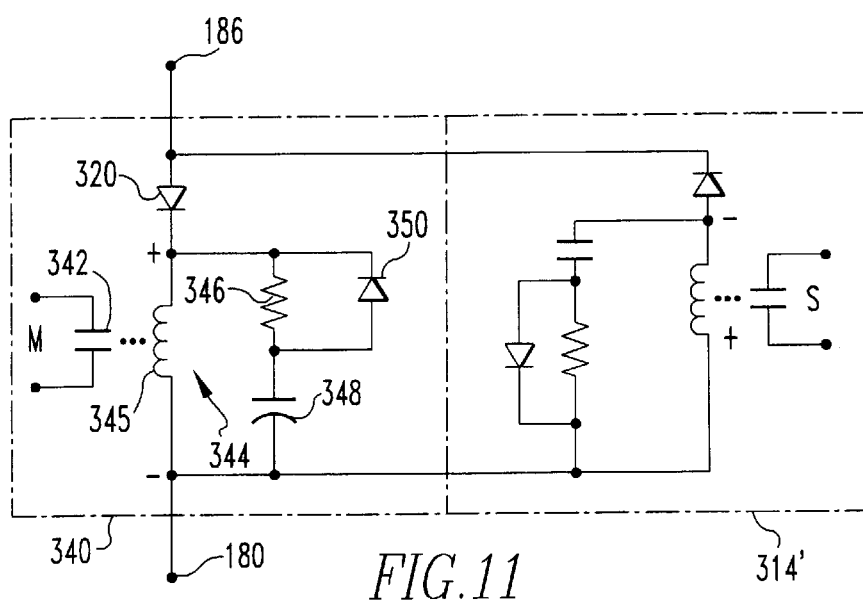
FIG. 11 is a block diagram of a panelboard monitoring circuit in accordance with another embodiment of the invention.

FIG. 11 shows another panelboard monitoring circuit 340, which is an alternative to the current detector circuit 312 of FIG. 10. The current detector circuit 340 generates an M output contact 342 from the current flowing from the SENSE terminal 186. The circuit 340 includes the diode 320, which has the same polarity as the diode 254 of the circuit breaker 250, and a relay 344 having its coil 345 in series with the diodes 254,320 with the current flowing from the SENSE terminal 186 flowing into the positive terminal of the coil 345. The M output contact 342 is closed in response to current flowing through the diodes 254,320 and the coil 345 of the relay 344. The relay 344 further has a resistor 346 electrically connected in series with a capacitor 348, with the series combination of the resistor 346 and the capacitor 348 being in parallel with the coil 345 of the relay 344. A freewheeling diode 350, which has an opposite polarity with respect to the diodes 254,320, is electrically connected in parallel with the resistor 346. The resistor 346 and capacitor 348 are preferably selected in order to provide suitable stretching of the positive half-wave AC waveform, in order to hold the M output contact 342 closed by employing the energy of the capacitor 348.

It will be appreciated that an equivalent stretching circuit 314' may be employed as an alternative to the circuit 314 of FIG. 10.

Figure 12:
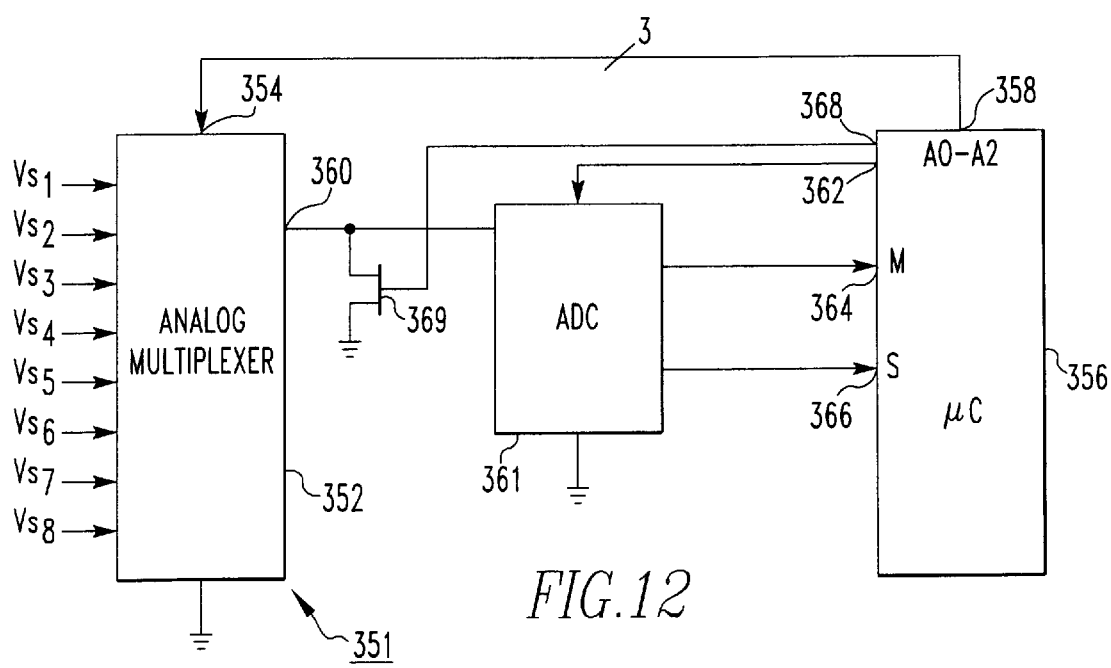
FIG. 12 is a block diagram of an analog multiplexer circuit for the panelboard monitoring circuit of FIG. 7 in accordance with an embodiment of the invention.

FIG. 12 shows an analog multiplexer circuit 351 for use with an exemplary count of eight of the panelboard monitoring circuits 202 of FIG. 7. The circuit 351 includes an analog multiplexer 352 having eight exemplary inputs each of which is electrically connected to the output 232 ($V_S$) of the peak detector circuit 214 for a corresponding circuit breaker, such as circuit breaker 170. The multiplexer 352 has an address selector input 354 which selects one of its eight inputs. A microcomputer ($\mu$C) 356 has outputs (A0–A2) 358 which sequence the selector input 354 of the multiplexer 352 for each of the corresponding eight circuit breakers (not shown). For example, for the selector input 354 equal to seven (A0=A1=A2=1), the input corresponding to output 232 ($V_{S8}$) is selected for the eighth circuit breaker, and that voltage is made available at the output 360 of the multiplexer 352 for ADC 361. In turn, the SC 356 sets output 362 to initiate the analog to digital-conversion and, then, reads the corresponding M and S values on inputs 364 and 366, respectively. After those values are read, the $\mu$C 356 sets output 368 to discharge, through FET 369, the capacitor 224 of the peak detector circuit 214 of FIG. 7. Finally, the $\mu$C 352 sequences the selector input 354 of the multiplexer 352 to the next one of the eight circuit breakers (e.g., the selector input 354 is set equal to zero (A0=A1=A2=0), and the input corresponding to output 232 ($V_{S1}$) is selected for the first circuit breaker.

Figure 13:
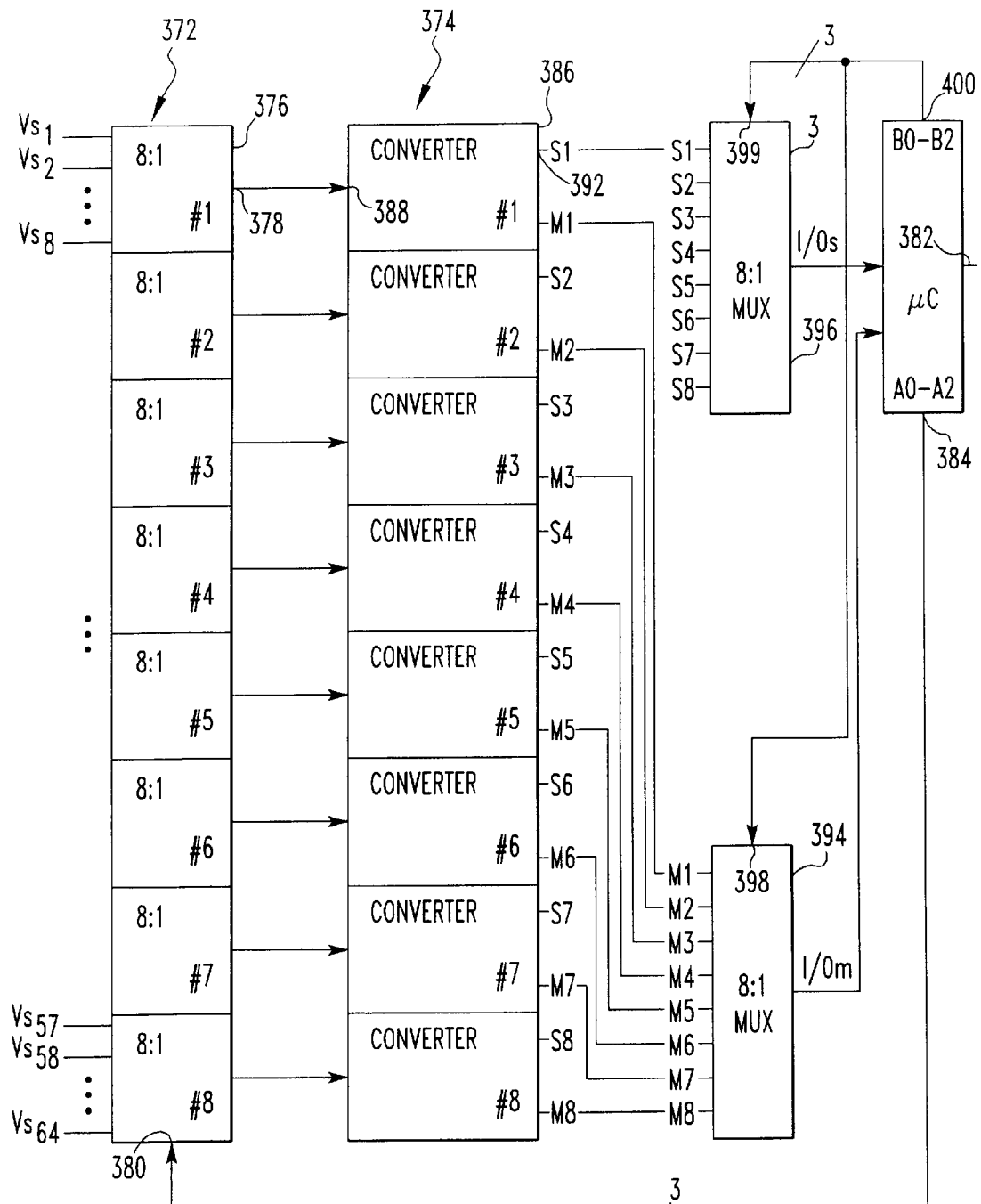
FIG. 13 is a block diagram of an analog and digital multiplexer circuit for the panelboard monitoring circuit of FIG. 7 in accordance with an embodiment of the invention.

FIG. 13 is a block diagram of an analog and digital multiplexer circuit 370 for use with an exemplary count of up to 64 of the panelboard monitoring circuits 202 of FIG. 7. The circuit includes an exemplary count of eight analog multiplexers 372 for up to 64 of the circuits 202, and an exemplary count of eight converters, such as ADCs 374. As shown with the first analog multiplexer 376, it has eight inputs and one output 378, with each of the inputs being electrically connected to the peak detector circuit 214 of a corresponding one of eight circuit breakers. Each of the multiplexer circuits 372 also has a selector input 380 selecting one of the inputs of the multiplexer circuit. As discussed above in connection with FIG. 12, a microcomputer ($\mu$C) 382 has outputs (A0–A2) 384 which sequence the selector input 380 of the multiplexers 372 for each of the corresponding circuit breakers. Each of the ADCs 374, such as 386, has its input 388 electrically connected to the output 378 of a corresponding one of the analog multiplexers, such as 376. The ADC 386 also has an M output, such as 390 (M1), and an S output, such as 392 (S1). A first 8:1 digital multiplexer 394 has eight exemplary inputs, each of which is electrically connected to the first output (M1–M8) of a corresponding one of the ADCs 374. A second 8:1 digital multiplexer 396 has eight exemplary inputs, each of which is electrically connected to the first output (S1–S8) of a corresponding one of the ADCs 374.

The digital multiplexer 394 has a selector input 398 selecting one of the first outputs (M1–M8) of the ADCs 374, and the digital multiplexer 396 has a selector input 399 selecting one of the second outputs (S1–S8) of the ADCs 374. The $\mu$C 382 has outputs (B0–B2) 400 which sequence the selector inputs 398,399 of the multiplexers 394,396 for each of the corresponding ADCs 374.

Although the exemplary circuit 370 has a modularity of 8×8, it will be appreciated that that any suitable modularity (e.g., 6×7) may be employed for any suitable count of circuit breakers (e.g., 42).

Figure 14:
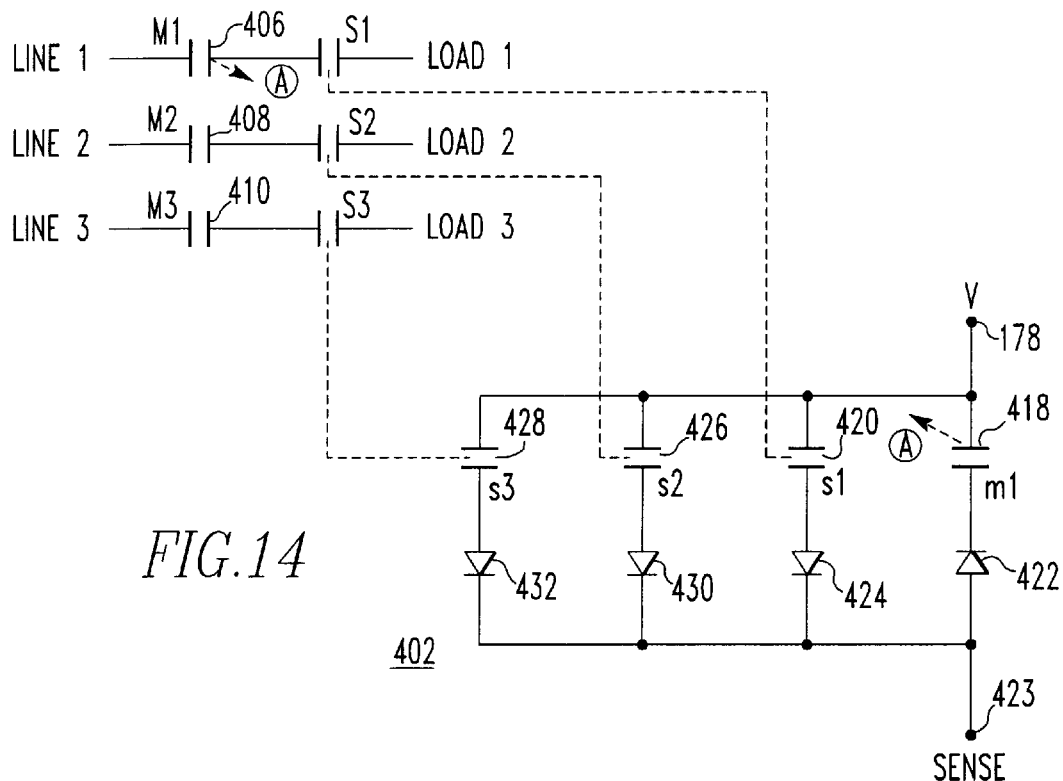
FIG. 14 is a block diagram of a three-pole circuit breaker in accordance with another embodiment of the invention.

FIG. 14 shows an exemplary three-pole circuit breaker 402 having three sets of main contacts 406,408,410 and three sets of relay switching contacts 412,414,416 in series with the respective sets of main contacts between a three-phase power source (LINE 1, LINE 2, LINE 3) and a three-phase load (LOAD 1, LOAD 2, LOAD 3). Somewhat similar to the circuit breaker 250 of FIG. 9, the circuit breaker 402 has a main auxiliary contact 418 response to the first main contacts 406 and a secondary auxiliary contact 420 responsive to the first secondary contacts 412. A diode 422 has its cathode electrically connected to the auxiliary contact 418 and its anode electrically connected to a SENSE terminal 423. Another diode 424 has its anode electrically connected to the auxiliary contact 420 and its cathode electrically connected to the SENSE terminal 423. The diodes 422,424 have their exemplary polarity reversed with respect to the diodes 254,256 of FIG. 9, although equivalent operation is possible by reversing the polarity of the diodes 422,424. In addition, the circuit breaker 402 also has second and third auxiliary contacts 426,428 which are responsive to the second and third secondary contacts 414,416, respectively. The circuit breaker 402 further has diodes 430,432 having their anodes electrically connected to the respective auxiliary contacts 426,428 and their cathodes electrically connected to the SENSE terminal 423. Again, equivalent operation is possible by reversing the polarity of the main diode 422 and each of the secondary diodes 424,430,432, with the latter diodes having the same polarity.

As is typical, the operating handles (not shown) of the circuit breaker 402 for the three phases are ganged such that the main separable contacts 406,408,410 have the same state (i.e., ON, tripped, OFF). The secondary contacts 412,414, 416 may, however, have different states. Hence, it will be appreciated that the circuit breaker 402 provides a signal at: the sense terminal 423 that may be decoded in order to determine whether the main separable contacts 406,408,410 are either closed or open (i.e., tripped/OFF), and whether any one of the secondary separable contacts 412,414,416 is closed or whether all of the secondary separable contacts 412,414,416 are open.

Figure 15:
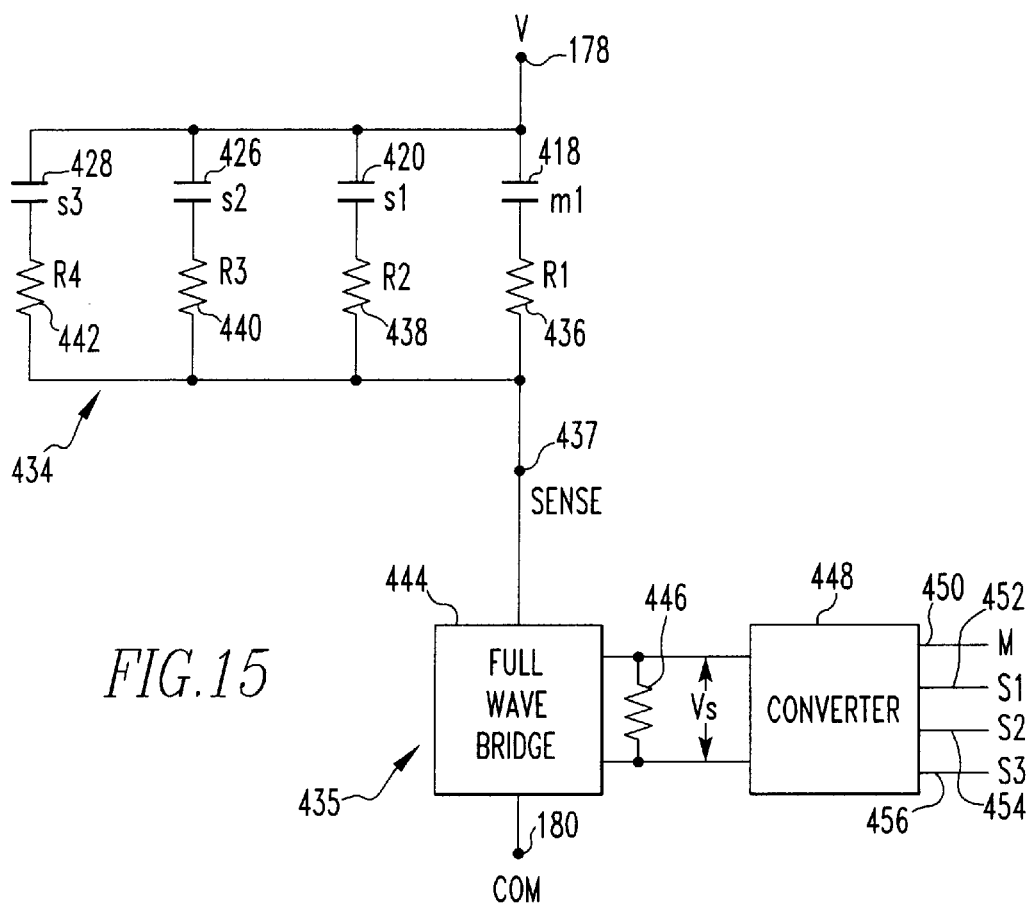
FIG. 15 is a block diagram of a three-pole circuit breaker and a panelboard monitoring circuit in accordance with another embodiment of the invention.

FIG. 15 shows a three-pole circuit breaker 434 and a panelboard monitoring circuit 435 in accordance with another embodiment of the invention. The circuit breaker 434 is similar to the circuit breaker 402 of FIG. 14, except that the diode circuit elements 422,424,430,432 are replaced by resistors 436,438,440,442. The exemplary panelboard monitoring circuit 435 includes full wave bridge 444, resistor 446 and converter 448. The circuit 435 is similar to the circuit 172 of FIG. 6, except that the converter 448 includes four outputs 450,452,454,456.

Preferably, for purposes of determining the state of each of the auxiliary contacts 418,420,426,428, the corresponding resistors 436,438,440,442 have different values in order to provide unique voltages ($V_S$) across resistor 446 based upon the open or closed states of the four respective auxiliary contacts 418,420,426,428. As a non-limiting example, the resistor 436 has a first resistance (e.g., 2 KΩ), the resistor 438 has a second resistance (e.g., 4 KΩ) which is about two times the first resistance, the resistor 440 has a third resistance (e.g., 8 KΩ) which is about four times the first resistance, and the resistor 442 has a fourth resistance (e.g., 16 KΩ) which is about eight times the first resistance. In turn, the four outputs 450,452,454,456 of the converter 448 have 16 ($2^4$) possible states, which are responsive to the 16 ($2^4$) possible unique voltages ($V_S$) across resistor 446 based upon the open or closed states of the four respective auxiliary contacts 418,420,426,428. Alternatively, some or all of the resistors 438,440,442 may have the same resistance value.

Although the converter 448 has been described in terms of an analog to digital converter (ADC) for use with the exemplary resistance values (e.g., 2, 4, 8, and 16 KΩ), a wide range of other different resistance values may be employed to provide unique voltages for detection by a suitable converter, such as a plural level detector. For example, for a two-pole circuit breaker, three resistors may be selected to provide three unique current values from the three corresponding auxiliary contacts of 1, 2 and 5 mA. In that manner, up to eight possible states of those auxiliary contacts may be encoded into up to eight unique current values (e.g., 0, 1, 2, 3, 5, 6, 7, 8 mA).

The present invention provides four different remote statuses to a panelboard by employing a conventional control voltage in combination with a single sensing lead for each single pole circuit breaker in the panelboard. The exemplary switching mechanism employed in such circuit breaker is advantageous in conventional thermal magnetic circuit breakers as well as in remote controlled circuit breakers having relay switching contacts. In this manner, the user is able to distinguish between a remote operation that opens or closes the relay switching contacts from the opening or closing of the main separable contacts. The invention is also applicable to multi-pole circuit breakers having separate relay switching contacts for each of the poles. The invention is further applicable to non-ganged multi-pole circuit breakers having separate relay switching contacts for each of the poles.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. An electrical distribution panel comprising:
   a circuit breaker comprising:
     a first set of separable contacts having an open state and a closed state,
     a first auxiliary switch responsive to the open and closed states of said first set of separable contacts,
     a second set of separable contacts in series with said first set of separable contacts, said second set of separable contacts having an open state and a closed state,
     a second auxiliary switch responsive to the open and closed states of said second set of separable contacts, said second auxiliary switch electrically connected to said first auxiliary switch,
     an input terminal electrically connected to both of said first and second auxiliary switches,
     an output terminal,
     a first circuit element electrically connected between said first auxiliary switch and said output terminal, and
     a second circuit element electrically connected between said second auxiliary switch and said output terminal;
   an enclosure housing said circuit breaker;
   a power source energizing said input terminal of said circuit breaker, said power source having a common reference;
   a bridge rectifier electrically connected between said output terminal and the common reference of said power source, said bridge rectifier having an output; and
   means for determining one of four states from the output of the bridge rectifier based upon four corresponding states of said first and second auxiliary switches of said circuit breaker and the open and closed states of said first and second sets of separable contacts.

2. The electrical distribution panel of claim 1 wherein said means for determining one of four states includes an analog-to-digital converter having at least two outputs, each of said outputs having two states.

3. The electrical distribution panel of claim 2 wherein said bridge rectifier includes a resistor in parallel with the output of the bridge.

4. The electrical distribution panel of claim 1 wherein said means for determining one of four states includes a four-level comparator circuit.

5. The electrical distribution panel of claim 1 wherein said means for determining one of four states includes an analog-to-digital converter.

6. An electrical distribution panel comprising:
   a plurality of circuit breakers each of which comprises:

a first set of separable contacts having an open state and a closed state, a first auxiliary switch having two states responsive to the open and closed states of said first set of separable contacts, a second set of separable contacts in series with said first set of separable contacts, said second set of separable contacts having an open state and a closed state, a second auxiliary switch having two states responsive to the open and closed states of said second set of separable contacts, said second auxiliary switch electrically connected to said first auxiliary switch, an input terminal electrically connected to both of said first and second auxiliary switches, an output terminal, a first circuit element electrically connected between said first auxiliary switch and said output terminal, and a second circuit element electrically connected between said second auxiliary switch and said output terminal;

an enclosure housing said circuit breakers;

a power source energizing said input terminal of said circuit breakers, said power source having a common reference; and means for determining one of four states from the output terminal of each of said circuit breakers based upon the two states of said first auxiliary switches and the two states of said second auxiliary switches of each of said circuit breakers.

7. The electrical distribution panel of claim 6 wherein said first circuit element is a first diode having a first polarity; wherein said second circuit element is a second diode having a different second polarity; and wherein said means for determining one of four states comprises for each of said circuit breakers:

a first current detector having a first polarity corresponding to the first polarity of said first diode; and a second current detector having a second polarity corresponding to the second polarity of said second diode.

8. The electrical distribution panel of claim 7 wherein said first current detector includes a first opto-coupler, which detects current flowing with the first polarity of said first diode and which has an output with a voltage corresponding to said current flowing with the first polarity; and wherein said second current detector includes a second opto-coupler, which detects current flowing with the second polarity of said second diode and which has an output with a voltage corresponding to said current flowing with the second polarity.

9. The electrical distribution panel of claim 8 wherein said means for determining one of four states further comprises for each of said circuit breakers:

a first circuit having a digital output corresponding to a first half-wave polarity voltage at the output of said first opto-coupler; and a second circuit having a digital output corresponding to a second half-wave polarity voltage at the output of said second opto-coupler.

10. The electrical distribution panel of claim 9 wherein each of said first and second circuits includes a first comparator having an input electrically connected to the output of a corresponding one of said first and second opto-couplers and also having an output; a filter electrically connected to the output of said first comparator; and a second comparator having an input electrically connected to the filtered output of the first comparator and also having an output with a digital signal corresponding to one of the half-wave polarity voltages at the output of said first and second opto-couplers.

11. The electrical distribution panel of claim 7 wherein said first current detector comprises a third diode having the first polarity of said first diode and a first relay having a coil in series with said third diode; and wherein said second current detector comprises a fourth diode having the second polarity of said second diode and a second relay having a coil in series with said fourth diode.

12. The electrical distribution panel of claim 11 wherein said first relay has a first contact which is closed in response to current flowing through said first and third diodes and the coil of said first relay; and wherein said second relay has a second contact which is closed in response to current flowing through said second and fourth diodes and the coil of said second relay.

13. The electrical distribution panel of claim 12 wherein said first relay further has a fifth diode electrically connected in parallel with the coil of said first relay and also having a polarity which is opposite the polarity of said first and third diodes; and wherein said second relay further has a sixth diode electrically connected in parallel with the coil of said second relay and also having a polarity which is opposite the polarity of said second and fourth diodes.

14. The electrical distribution panel of claim 12 wherein said first relay further has a resistor electrically connected in series with a capacitor, with the series combination of said resistor and said capacitor in parallel with the coil of said first relay, said first relay also has a fifth diode electrically connected in parallel with said resistor, said fifth diode having a polarity which is opposite the polarity of said first and third diodes; and wherein said second relay further has a resistor electrically connected in series with a capacitor, with the series combination of the last said resistor and the last said capacitor in parallel with the coil of said second relay, said second relay also has a sixth diode electrically connected in parallel with the last said resistor, said sixth diode having a polarity which is opposite the polarity of said second and fourth diodes.

15. The electrical distribution panel of claim 6 wherein said power source is an alternating current power source; and wherein said means for determining one of four states from the output terminal of each of said circuit breakers comprises for each of said circuit breakers:

a current transformer having an input electrically connected between the output terminal of one of said circuit breakers and the common reference of said alternating current power source, said current transformer also having an output;

a bridge rectifier circuit having an input electrically connected to the output of said current transformer, said bridge rectifier circuit also having an output; and a peak detector circuit electrically connected to the output of said bridge rectifier circuit.

16. The electrical distribution panel of claim 15 wherein said peak detector circuit has an output; and wherein said means for determining one of four states from the output terminal of each of said circuit breakers further comprises a four-level comparator circuit electrically connected to the output of said peak detector circuit.

17. The electrical distribution panel of claim 15 wherein said peak detector circuit has an output; and wherein said means for determining one of four states from the output terminal of each of said circuit breakers further comprises an analog-to-digital converter having at least two outputs, each of said outputs having two states.

18. The electrical distribution panel of claim 15 wherein said means for determining one of four states from the output terminal of each of said circuit breakers further comprises:
- a multiplexer circuit having a plurality of inputs each of which is electrically connected to the peak detector circuit of a corresponding one of said circuit breakers, said multiplexer circuit also having a selector input selecting one of the inputs of said multiplexer circuit, and an output;
- a circuit sequencing the selector input for each of said circuit breakers; and
- means for determining one of four states from the output of said multiplexer circuit for each of said circuit breakers based upon the two states of said first auxiliary switches and the two states of said second auxiliary switches of each of said circuit breakers.

19. The electrical distribution panel of claim 15 wherein a count of said circuit breakers is equal to N times M; and wherein said means for determining one of four states from the output terminal of each of said circuit breakers further comprises:
- a count of M analog multiplexers each of which has N inputs and one output, with each of said inputs electrically connected to the peak detector circuit of a corresponding one of a count of N circuit breakers, each of said multiplexer circuits also having a selector input selecting one of the inputs of said multiplexer circuit;
- a circuit sequencing the selector input for each of said analog multiplexers;
- a count of M analog-to-digital converters each of which is electrically connected to the output of a corresponding one of said analog multiplexers and each of which has a first output and a second output;
- a first digital multiplexer having M inputs each of which is electrically connected to the first output of a corresponding one of said analog-to-digital converters, said first digital multiplexer also having a selector input selecting one of the first outputs of said analog-to-digital converters;
- a second digital multiplexer having M inputs each of which is electrically connected to the second output of a corresponding one of said analog-to-digital converters, said second digital multiplexer also having a selector input selecting one of the second outputs of said analog-to-digital converters; and
- a circuit sequencing the selector inputs for each of said first and second digital multiplexers.

20. An electrical distribution panel comprising:
- an N-pole circuit breaker comprising:
    - N sets of first separable contacts, each of said first separable contacts having an open state and a closed state,
    - a first auxiliary switch responsive to the open and closed states of one of said N sets of first separable contacts,
    - N sets of second separable contacts, each of which is in series with a corresponding one of said first separable contacts, each of said second separable contacts having an open state and a closed state,
    - N second auxiliary switches, each of which is responsive to the open and closed states of a corresponding one of said second separable contacts,
    - an input terminal electrically connected to said first auxiliary switch and said second auxiliary switches,
    - an output terminal,
    - a first circuit element electrically connected between said first auxiliary switch and said output terminal, and
    - N second circuit elements, each of which is electrically connected between a corresponding one of said second auxiliary switches and said output terminal;
- an enclosure housing said circuit breaker;
- a power source energizing said input terminal of said circuit breaker, said power source having a common reference; and
- means for determining greater than N states from said output terminal based upon $2^N$ states of said first and second auxiliary switches of said circuit breaker.

21. The electrical distribution panel of claim 20 wherein said first and second circuit elements include N+1 different resistors.

22. The electrical distribution panel of claim 20 wherein said N-pole circuit breaker is a three-pole circuit breaker; and wherein said N+1 different resistors are four different resistors.

23. The electrical distribution panel of claim 22 wherein said four different resistors include a first resistor having a first resistance, a second resistor having a second resistance which is about two times the first resistance, a third resistor having a third resistance which is about four times the first resistance, and a fourth resistor having a fourth resistance which is about eight times the first resistance.

24. The electrical distribution panel of claim 23 wherein said means for determining greater than N states determines $2^N$ states.

* * * * *